US008065492B2

(12) United States Patent
Moshayedi

(10) Patent No.: US 8,065,492 B2
(45) Date of Patent: Nov. 22, 2011

(54) SYSTEM AND METHOD FOR EARLY DETECTION OF FAILURE OF A SOLID-STATE DATA STORAGE SYSTEM

(75) Inventor: Mark Moshayedi, Orange, CA (US)

(73) Assignee: STEC, Inc., Santa Ana, CA (US)

( * ) Notice: Subject to any disclaimer, the term of this patent is extended or adjusted under 35 U.S.C. 154(b) by 362 days.

(21) Appl. No.: 10/943,483

(22) Filed: Sep. 17, 2004

(65) Prior Publication Data
US 2005/0044454 A1 Feb. 24, 2005

Related U.S. Application Data

(63) Continuation of application No. 10/032,149, filed on Dec. 20, 2001, now abandoned.

(60) Provisional application No. 60/257,760, filed on Dec. 22, 2000, provisional application No. 60/257,648, filed on Dec. 22, 2000.

(51) Int. Cl.
G06F 11/00 (2006.01)

(52) U.S. Cl. ........... 711/154; 711/100; 711/103; 714/54

(58) Field of Classification Search .................. 711/100, 711/103, 154; 714/54
See application file for complete search history.

(56) References Cited

U.S. PATENT DOCUMENTS

| 4,460,997 | A | | 7/1984 | Harns |
| 4,891,811 | A | | 1/1990 | Ash et al. |
| 5,267,242 | A | | 11/1993 | Lavallee et al. |
| 5,283,790 | A | | 2/1994 | Kawashita |
| 5,371,882 | A | | 12/1994 | Ludlam |
| 5,410,687 | A | | 4/1995 | Fujisaki et al. |
| 5,418,767 | A | | 5/1995 | Gaudet et al. |
| 5,434,868 | A | | 7/1995 | Aichelmann, Jr. et al. |
| 5,541,846 | A | * | 7/1996 | Secrest .................. 700/110 |
| 5,717,694 | A | | 2/1998 | Ohsawa |
| 5,751,947 | A | * | 5/1998 | Arakawa .................. 714/54 |
| 5,867,641 | A | | 2/1999 | Jenett |
| 5,889,784 | A | | 3/1999 | Rogers |
| 5,953,737 | A | * | 9/1999 | Estakhri et al. ............ 711/103 |
| 5,974,564 | A | | 10/1999 | Jeddeloh |
| 5,983,374 | A | | 11/1999 | Todome et al. |
| 6,000,006 | A | * | 12/1999 | Bruce et al. ............... 711/103 |
| 6,011,733 | A | | 1/2000 | Fischer et al. |

(Continued)

Primary Examiner — Jasmine Song
(74) Attorney, Agent, or Firm — McDermott Will & Emery LLP

(57) ABSTRACT

Various embodiments are disclosed of a failure detection system for a solid-state data storage system that can experience difficulties, such as system failure or loss of data integrity, when it runs out of spare storage locations. Spare storage locations can be used by a solid-state data storage system to replace storage locations that have become defective. In one embodiment, a count is kept of the available spare storage locations in a system, or sub-system, and when the amount of available spare locations drops to a threshold value, an action can be taken to avoid the consequences of an impending failure. In other embodiments, the available spare storage locations are monitored by keeping track of the percentage of initially available spare locations still remaining, by keeping track of the rate of new spare locations being used, or by other techniques. In various embodiments, the early failure detection system responds to detection of a possible impending failure by taking one or more of a variety of actions, including, for example, sending an alert notification, enabling additional storage capacity, copying portions of the data stored in the system to other secure storage locations, shutting the system down, and taking no action.

17 Claims, 5 Drawing Sheets

U.S. PATENT DOCUMENTS

| | | |
|---|---|---|
| 6,032,264 A | 2/2000 | Beffa et al. |
| 6,085,334 A * | 7/2000 | Giles et al. .................... 714/7 |
| 6,115,828 A | 9/2000 | Tsutsumi et al. |
| 6,163,490 A | 12/2000 | Shaffer et al. |
| 6,219,810 B1 | 4/2001 | Debenham |
| 6,405,323 B1 * | 6/2002 | Lin et al. ...................... 714/8 |
| 6,446,223 B1 * | 9/2002 | Morishita et al. ............. 714/47 |
| 6,480,982 B1 | 11/2002 | Chan et al. |

* cited by examiner

SYSTEM AND METHOD FOR EARLY DETECTION OF FAILURE OF A SOLID-STATE DATA STORAGE SYSTEM

CLAIM FOR PRIORITY

This application is a continuation of U.S. Application No. 10/032,149 Dec. 20, 2001 now abandoned which claimed the benefit of U.S. Provisional Application 60/257,760, filed on Dec. 22, 2000, and benefit of U.S. Provisional Application 60/257,648, filed on Dec. 22, 2000.

BACKGROUND OF THE INVENTION

1. Field of the Invention

The present invention relates to systems and methods for managing defects in a digital data storage system. More particularly, the invention relates to systems and methods for early failure detection on memory devices such as Flash EEPROM devices.

2. Description of the Related Art

Computer systems typically include magnetic disk drives for the mass storage of data. Although magnetic disk drives are relatively inexpensive, they are bulky and contain high-precision mechanical parts. As a consequence, magnetic disk drives are prone to reliability problems, and as such are treated with a high level of care. In addition, magnetic disk drives consume significant quantities of power. These disadvantages limit the size and portability of computer systems that use magnetic disks, as well as their overall durability.

As demand has grown for computer devices that provide large amounts of storage capacity along with durability, reliability, and easy portability, attention has turned to solid-state memory as an alternative or supplement to magnetic disk drives. Solid-state storage devices, such as those employing Dynamic Random Access Memory (DRAM) and Static Random Access Memory (SRAM), require lower power and are more durable than magnetic disk drives, but are also more expensive and are volatile, requiring constant power to maintain their memory. As a result, DRAM and SRAM devices are typically utilized in computer systems as temporary storage in addition to magnetic disk drives.

Another type of solid-state storage device is a Flash EEPROM device (hereinafter referred to as flash memory). Flash memory exhibits the advantages of DRAM and SRAM, while also providing the benefit of being non-volatile, which is to say that a flash memory device retains the data stored in its memory even in the absence of a power source. For this reason, for many applications, it is desirable to replace conventional magnetic disk drives in computer systems with flash memory devices.

One characteristic of some forms of non-volatile solid-state memory is that storage locations that already hold data are typically erased before they re-written. Thus, a write operation to such a memory location is in fact an erase/write operation, also known as an erase/write cycle. This characteristic stands in contrast to magnetic storage media in which the act of re-writing to a location automatically writes over whatever data was originally stored in the location, with no need for an explicit erase operation.

Another characteristic of some forms of non-volatile solid-state memory is that repeated erase/write operations can cause the physical medium of the memory to deteriorate, as, for example, due to Time-Dependent-Dielectric-Breakdown (TDDB). Because of this characteristic deterioration, non-volatile solid-state storage systems can typically execute a finite number of erase/write operations in a given storage location before developing a defect in the storage location. One method for managing operation of a data storage system in the face of these defects is the practice of setting aside a quantity of alternate storage locations to replace storage locations that become defective. Such alternate storage locations are known as spare storage locations or "spares" locations. Thus, when a storage location defect is detected during a write operation, the data that was intended for storage in the now-defective location can be written instead to a "spares" location, and future operations intended for the now-defective location can be re-directed to the new spares location. With this method of defect recovery, as long as a sufficient number of spares locations have been set aside to accommodate the defects that occur, the system may continue to operate without interruption in spite of the occurrence of defects.

When a defect occurs and no free spares locations remain to serve as alternate data storage locations, the storage system can fail. Endurance is a term used to denote the cumulative number of erase/write cycles before a device fails. Reprogrammable non-volatile memories, such as flash memory, have a failure rate associated with endurance that is best represented by a classical "bathtub curve." In other words, if the failure rate is drawn as a curve that changes over the lifetime of a memory device, the curve will resemble a bathtub shape. The bathtub curve can be broken down into three segments: a short, initially high, but steeply decreasing segment, sometimes called the "infant mortality phase" during which failures caused by manufacturing defects appear early in the life of a device and quickly decrease in frequency; a long, flat, low segment that represents the normal operating life of a memory device with few failures; and a short, steeply increasing segment, sometimes called the "wear-out phase," when stress caused by cumulative erase/write cycles increasingly causes failures to occur. Thus, towards the end of a device's life span, deterioration can occur rapidly.

Often, when a storage system fails, the data contained in the storage system is partially or completely lost. In applications where a high value is placed on continued data integrity, storage systems prone to such data loss may not be acceptable, in spite of any other advantages that they may offer. For instance, a high degree of data integrity is desirable in a data storage systems that is used in a router to hold copies of the router's configuration table, which can grow to massive size for a very large router. A high degree of data integrity is also desirable in data storage systems used to hold temporary copies of the data being transferred through a router. In this instance, ensuring a high level of data integrity is complicated by the fact that a very high number of erase/write operations are executed during the operation of such an application.

A challenge faced by reliability engineers is how to monitor a device's ability to cope with defects and to predict a device's failure so that data loss due to unanticipated system failures does not occur.

SUMMARY OF THE INVENTION

Spares locations in a digital data storage system are often set aside as alternate locations for data in the event that defects occur. As long as a sufficient number of spares locations remain available, a data storage system can handle the occurrence of new defects. When a system runs out of spares, however, the system can fail and data can be lost. In order to ensure the integrity of a data storage system, it is desirable to be able to predict and to avoid such failures.

An inventive method and system for early failure detection in a computer system is described herein that allows a digital data storage system to monitor the number of available spares remaining in some or all of its associated memory and to take appropriate preemptive action to avoid the consequences of an unanticipated failure. The early failure detection method and system can be implemented in a wide variety of embodiments depending on the configuration, needs, and capabilities of the computer system.

In a data storage system or device that can run out of spare storage locations for replacing defective storage locations, various embodiments are disclosed of an early failure detection system. In one embodiment, a count is kept of the available spare storage locations in a system, or sub-system, and when the amount of available spare locations drops to a threshold value, an action can be taken to avoid the consequences of an impending system failure. In other embodiments, the available spare storage locations are monitored by various other methods, for example, by keeping track of the percentage of initially available spare locations still remaining, by keeping track of the rate of new spare locations being used, or by other techniques. Various procedures, data structures, and hardware for implementing the early failure detection system may reside and may be executed in various locations, or parts, of the data storage system. Various actions may be undertaken by the early failure detection system upon detecting a possible impending failure, depending on the needs and capabilities of the system. Such actions may include, but are not limited to, sending out an alert, copying data from jeopardized parts of the system to non-jeopardized parts of the system, expanding the storage capacity of the system, and shutting down the system.

One embodiment of an early failure detection system for a flash memory system is described in which the flash memory system designates a quantity of storage locations as spares locations that are assigned for use as alternate storage locations in the event that defects occur. The early failure detection system comprises evaluating the quantity of spares locations available for assignment as alternate storage locations to determine if a threshold value has been reached and taking a preemptive action to avert impending failure of the flash memory system in the event that the quantity of spares locations reaches the threshold limit.

In one embodiment, the early failure detection system is a method comprising assigning a quantity of storage locations within a storage device to serve as spare storage locations and predicting the usability of the storage device based on the quantity of unused spare storage locations.

In one embodiment, the early failure detection system is a method of determining the usability of a solid-state storage device which comprises assigning a quantity of storage locations within a solid-state storage device to serve as spare storage locations in the event defects occur in the storage locations and predicting the usability of the solid-state storage device based on the quantity of unused spare storage locations.

In one embodiment, the early failure detection system is a method of monitoring the life expectancy of a flash memory device that comprises: assigning a quantity of storage locations within a flash memory device to serve as spare storage locations which are used when defects occur in the flash memory device, comparing the number of available spare locations with a predetermined threshold, and performing an action when the quantity of unused spare storage locations falls below the predetermined threshold, so as to avoid the consequences of a potential failure of the flash memory.

In one embodiment, the early failure detection system is implemented as a solid-state storage device comprising a plurality of storage locations, a plurality of spare storage locations that are used when defects occur in the storage locations, and processor circuitry configured to predict the usability of the solid-state storage device based on the quantity of unused spare storage locations.

In one embodiment, the early failure detection system is implemented as a flash memory device comprising a plurality of storage locations, a plurality of spare storage locations, a predetermined threshold value, and processor circuitry configured to compare the number of available spare storage locations with the predetermined threshold, and to perform an action when the quantity of unused spare storage locations falls below the predetermined threshold, so as to avoid the consequences of a potential failure of the flash memory.

In one embodiment, the early failure detection system is a method of determining the usability of a solid-state storage device, comprising assigning a quantity of storage locations within a solid-state storage device to serve as spare storage locations that are used when defects occur in the storage locations, monitoring the number of available spare storage locations, and performing an action when the quantity of unused spare storage locations falls below a desired amount, so as to avoid the consequences of a potential failure of the solid-state storage device.

One embodiment of an early failure detection system for a digital data storage system is described that designates a quantity of storage locations as spares locations that are assigned for use as alternate storage locations in the event that defects occur, that evaluates the quantity of spares locations available for assignment as alternate storage locations to determine if a threshold value has been reached, and that takes a preemptive action to avert impending failure of the digital data storage system in the event that the quantity of spares locations reaches the threshold limit.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Furthermore, although the early failure detection system is described herein with respect to embodiments that implement solid-state non-volatile memory, use of the system with respect to embodiments that implement non-solid-state memory is also contemplated.

DETAILED DESCRIPTION OF THE PREFERRED EMBODIMENTS

A system and method for detecting an impending failure of a non-volatile storage device is disclosed herein. In order to fully specify the preferred design, various embodiment-specific details are set forth. For example, the early failure detection system is described within the example embodiment of a flash memory digital data storage system. It should be understood, however, that these details are provided to illustrate the preferred embodiments, and are not intended to limit the scope of the invention. The early failure detection system is not limited to embodiments using flash memory, and other embodiments, including those that employ other types of storage devices, such as other solid-state memory systems and non-solid-state memory systems, are also contemplated.

Figure 1A:
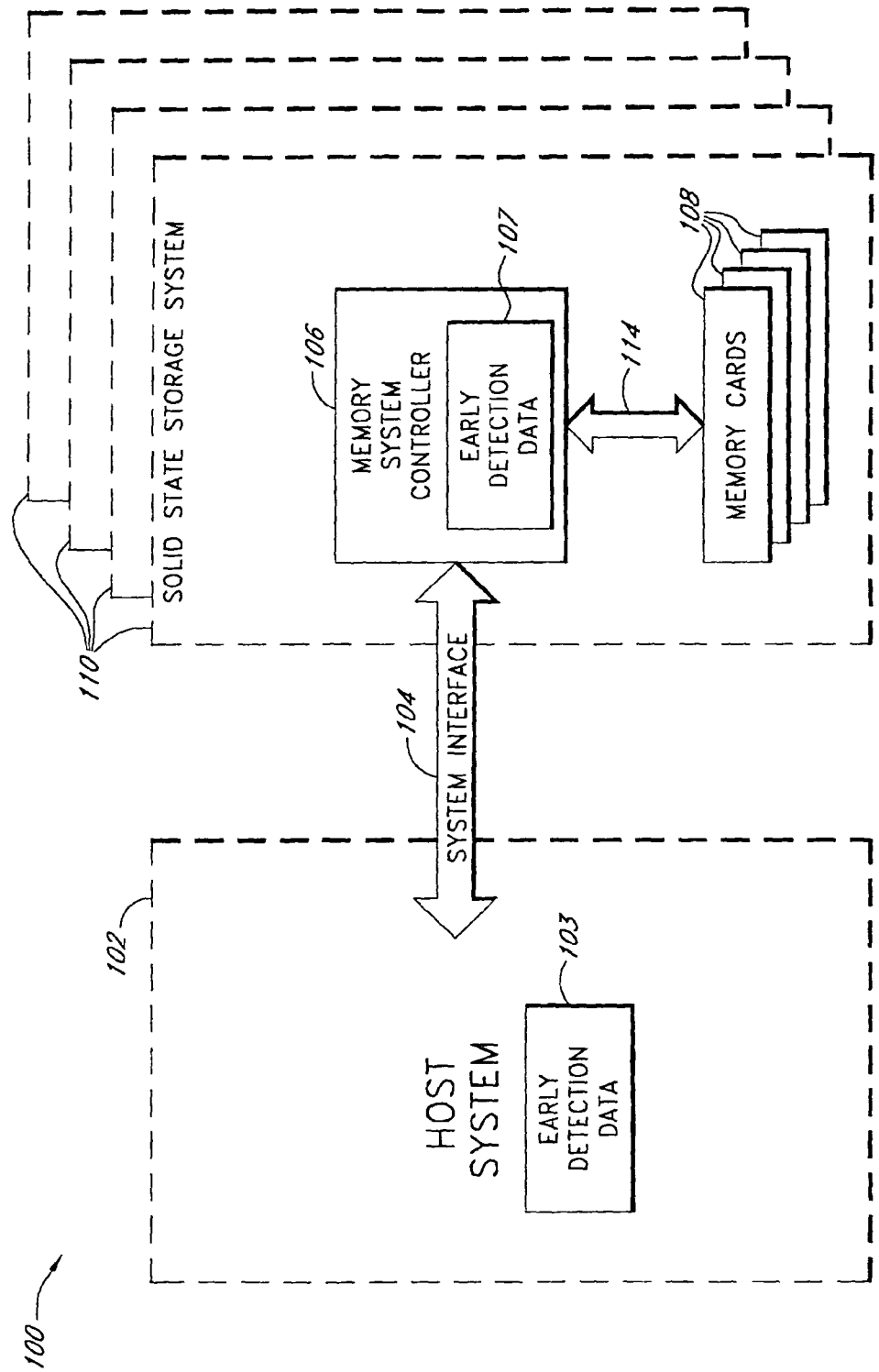
FIG. 1A is a high-level block diagram illustrating a general computer system with solid-state storage that implements an embodiment of the early failure detection system.

FIG. 1A illustrates one embodiment of a general configuration for a computer system 100 that can implement embodiments of the early failure detection system disclosed herein. The computer system 100 comprises a host system 102 and a plurality of storage devices, which in FIG. 1A are depicted as solid-state storage systems 110. The host system 102 can be any of a variety of processor-based devices that store data in a digital data storage system such as the solid-state storage system 110 shown in FIG. 1A. For example, the host system 102 could be a router that serves as a large network backbone, a Small Computer System Interface (SCSI) controller, a relatively small digital camera system, or any of a very large number of alternatives.

The host system 102 communicates with the solid-state storage systems 110 by way of a system interface 104. The solid-state storage systems 110 store data for the host system 102. A solid-state storage system 110 comprises a memory system controller 106, an array of one or more memory cards 108, and a communication interface 114, by means of which the memory system controller 106 communicates with the memory card array 108.

In various embodiments, the controller 106 can comprise controller circuitry, processor circuitry, processors, general purpose single-chip or multi-chip microprocessors, digital signal processors, embedded microprocessors, micro-controllers, and the like. In the embodiment illustrated in FIG. 1A, the memory card array 108 can be an array of flash memory cards. However, other types of memory media, including magnetic memory and other types of solid-state memory media may be used without departing from the spirit of the early failure detection system. Similarly, the memory can be implemented on an individual card, chip, device, or other component, or on a plurality or variety of such cards, chips, devices, or other components.

On receipt of a command from the host system 102, the memory system controller 106 manages execution of the command. When the host 102 issues a write command to the solid-state storage system 110, the controller 106 transfers data from the system interface 104 to a storage location in the array of memory cards 108. When the command is a read command, the controller 106 orchestrates a transfer of data from one or more locations in the memory card array 108 that correspond to a host-provided address received via the system interface 104. The controller 106 transfers the data from the memory array 108 to the host system 102, again by way of the system interface 104.

An early failure detection system, as described herein, can be implemented in a computer system 100 to monitor memory locations and to take preemptive action if an impending memory failure is anticipated. As will be described in greater detail below, the early failure detection system can be implemented in a variety of embodiments. In accordance with some embodiments, early detection data 103, as well as associated structures, procedures, or code, may all be stored within the host system 102. In accordance with some embodiments, early detection data 107, again possibly accompanied by associated structures, procedures, or code, may be stored with the memory system controller 106 of the solid-state storage system 110. In other embodiments, early detection data 107, again possibly accompanied by associated structures, procedures, or code, may be stored, to various extents, in one or both locations.

Figure 1B:
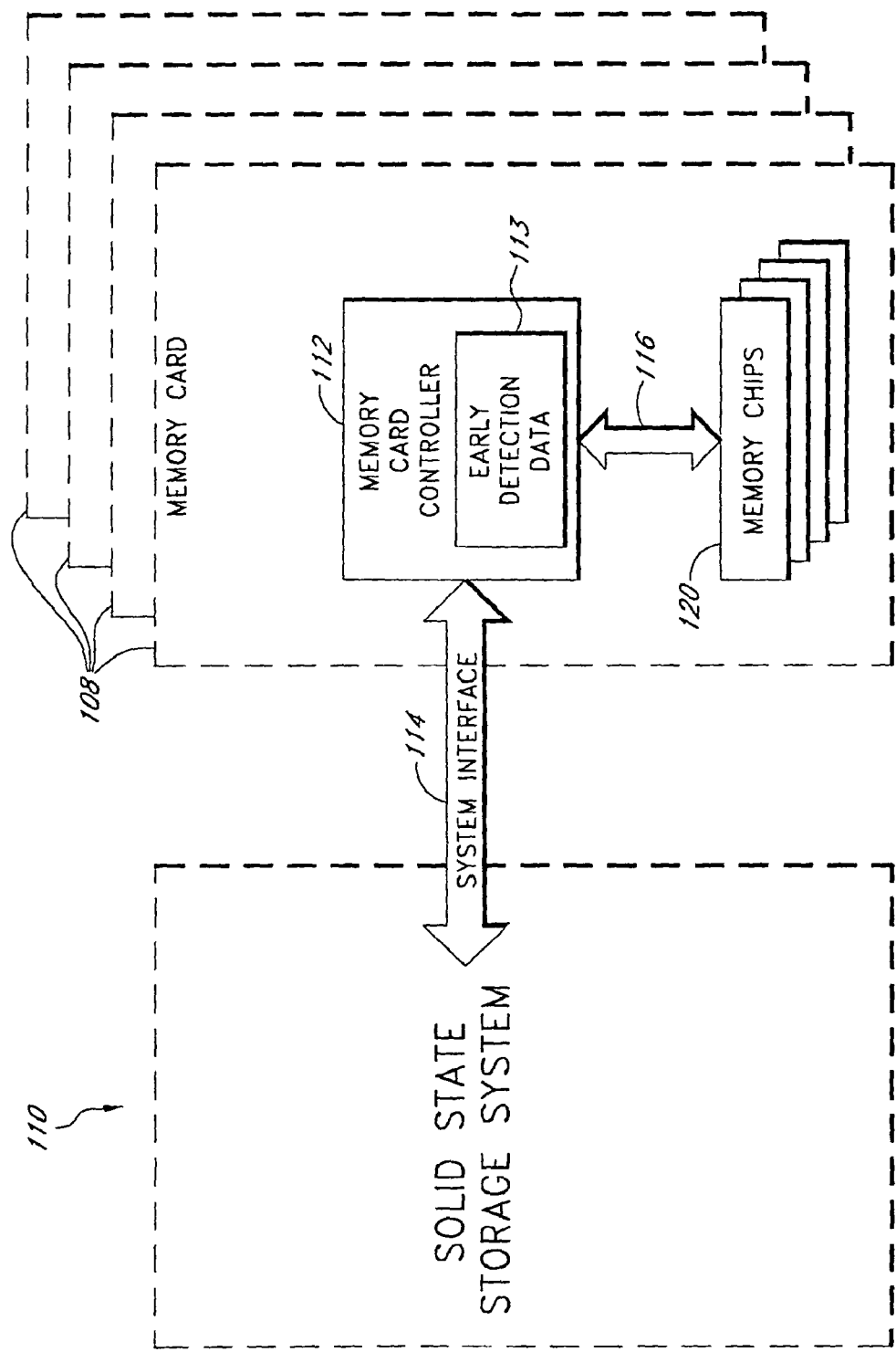
FIG. 1B is a more detailed block diagram illustrating a solid-state storage system that implements an embodiment of the early failure detection system.

FIG. 1B depicts a more detailed view of one embodiment of a solid-state storage system 110. As in FIG. 1A, FIG. 1B shows the solid-state storage system 110 comprising a memory system controller 106 that communicates with an array of one or more memory cards 108 via an interface 114. The memory system controller 106 may store early detection data 107 for the use of the early failure detection system. FIG. 1B further shows that a memory card 108 comprises a memory card controller 112 that communicates with an array 120 of one or more memory chips via a memory card interface 116. In accordance with some embodiments of the early failure detection system, early detection data 113 may be stored within the memory card controller 112.

Figure 2:
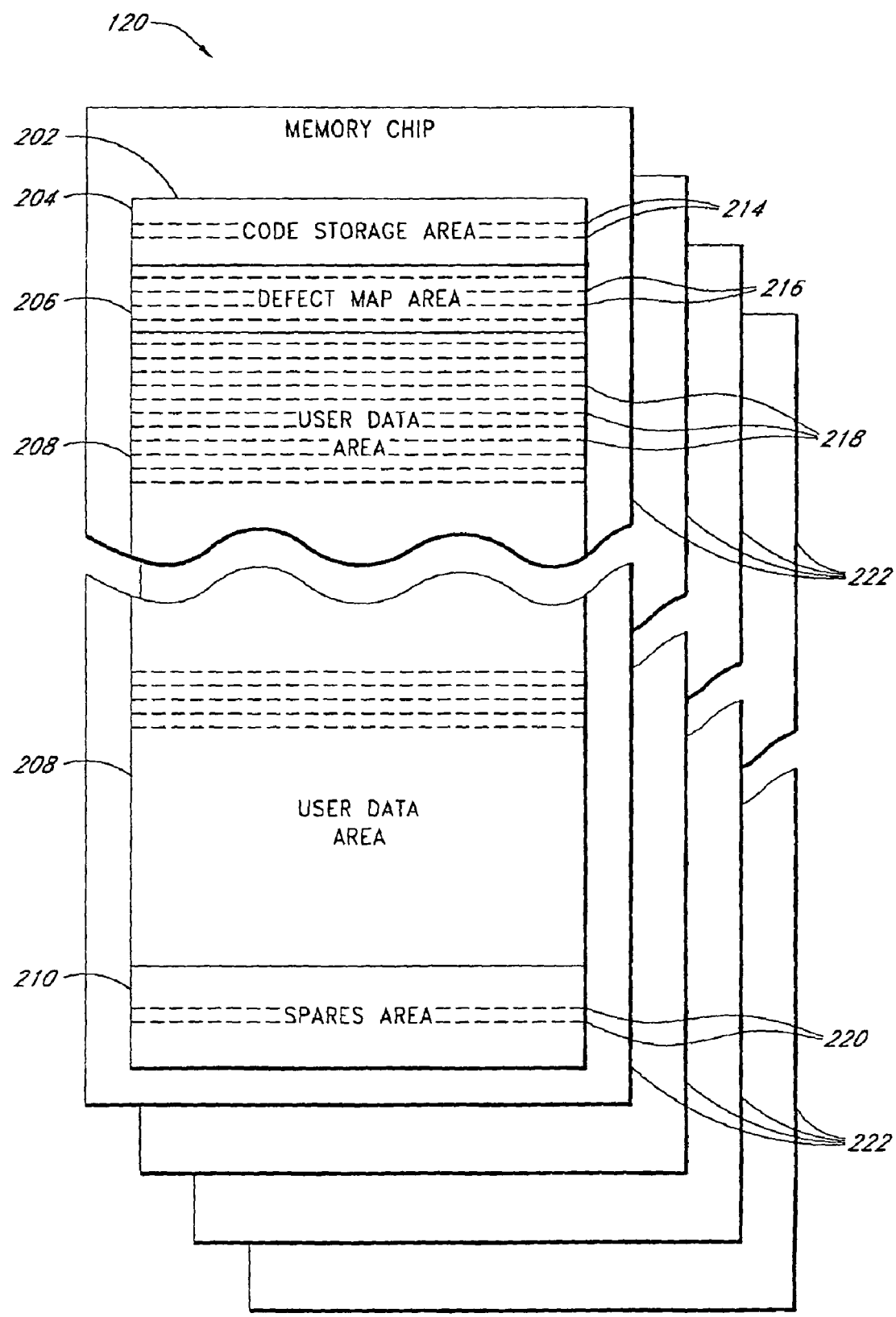
FIG. 2 is a block diagram illustrating a plurality of memory area divisions occurring on solid-state memory chips in accordance with one embodiment of the early failure detection system.

FIG. 2 illustrates a more detailed view of one embodiment of the memory array 120 comprising four memory chips 222. As illustrated in FIG. 2, each memory chip 222 of the memory array 120 comprises a memory storage space 202, which is divided into a plurality of memory areas 204, 206, 208, 210. In the embodiment illustrated, the storage area 202 comprises a code storage area 204, a defect map area 206, a user data area 208, and a spares area 210.

Each of these memory areas 204, 206, 208, 210 is further subdivided into a plurality of individually erasable and addressable storage locations 214, 216, 218, 220, also called rows. In one embodiment, a row 214, 216, 218, 220 typically holds a plurality of sectors for storing data and a sector for holding control data usable by the memory card controller 112 in managing the memory card 108.

The code storage area 204 is a memory storage area for machine firmware code that provides instructions to the memory card controller 112. The user data area 208 is a memory storage area for data supplied by, and for the use of, the host system 102. As illustrated, the user data area 208 comprises most of the memory space 202 within the memory chip 222. In one embodiment, data read and write commands sent by the host system 102 to the memory card controller 112 have an associated host-provided logical address that identifies the desired data. The memory card controller 112 attempts to identify an associated location 218 in the user area 208 that corresponds to the host-provided logical address and that holds, or will hold, the desired data, so that the host command can be executed.

When a defect develops in a user data area location 218, in some embodiments the location 218 is no longer useful for data storage purposes, and the memory card controller 112 attempts to identify an alternate, non-defective storage location for the data associated with the host-provided logical address.

In one embodiment, the spares area 210 comprises alternate storage locations that have been set aside for data that was previously located in user data area locations 218 that have developed defects. In the event that a defect in a user data area location 218 is detected during an erase/write operation, an unused alternate location 220 in the spares area 210 can be used for writing the data and can be assigned to the host-provided logical address for future data access needs.

The defect map area 206 is a memory storage location for a defect map, which, in one embodiment, is a list of relocation information for data items that have been relocated from the user data area 208 to the spares area 210 due to the development of defects in their original storage locations. In one embodiment, for each moved data item, the defect map 206 comprises a logical identifier for the data item, as well as a reference to a new location in the spares area 210 to which the data item has been moved. Thus, the defect map 206 can be used to locate data that have been moved to the spares area 210.

Although FIG. 2 shows the memory chip 222 subdivided into distinct areas and having a distinct organization, the types, locations, and organization of memory areas in the memory space 202 of the memory chip 222 may be substantially altered without detracting from the spirit of the early failure detection system.

Similarly, although FIG. 2 shows the memory array 120 comprising four substantially similar memory chips 222, the number and types of memory chips may be substantially altered without detracting from the spirit of the early failure detection system.

Figure 3:
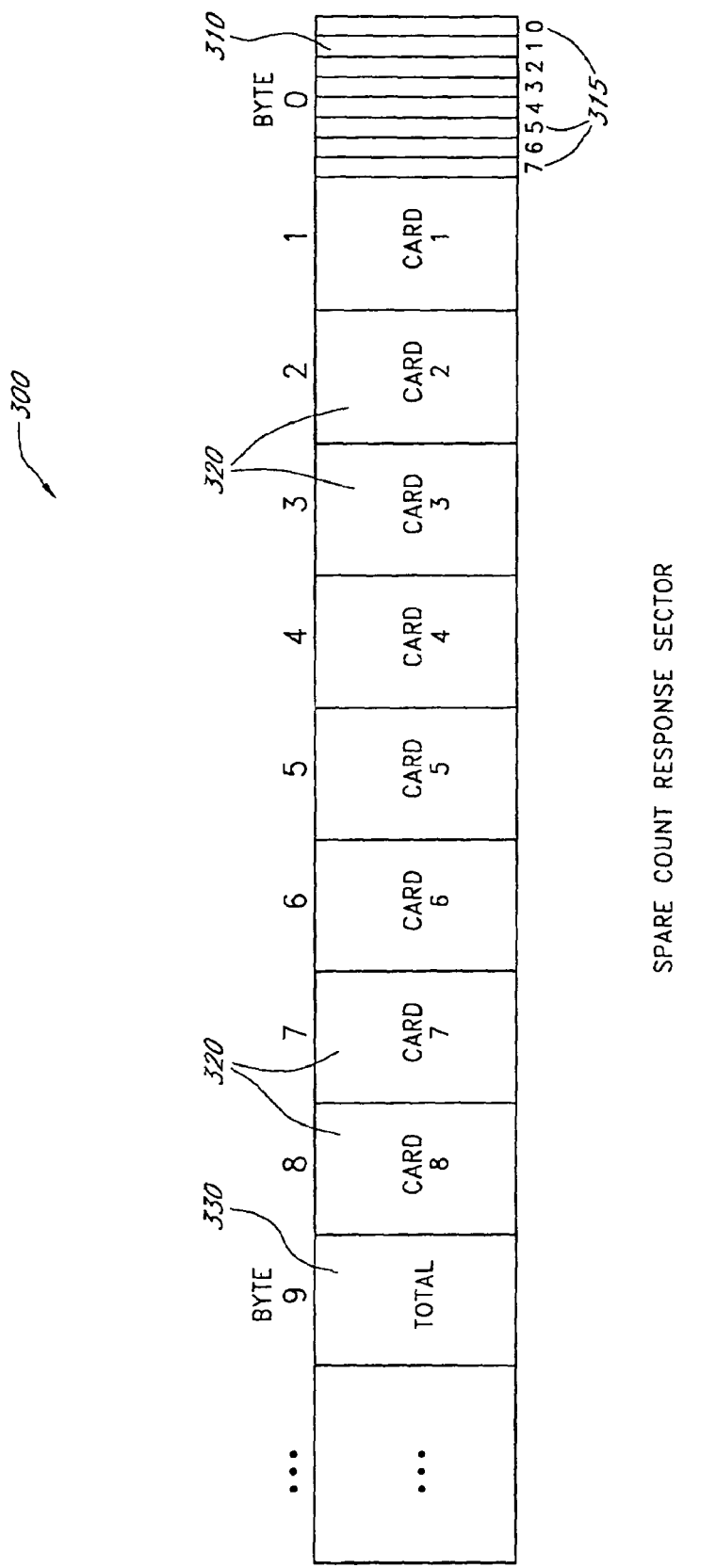
FIG. 3 illustrates one embodiment of a structure for a spares count response sector utilized in accordance with one embodiment of the early failure detection system.

FIG. 3 shows one embodiment of a spares count response sector 300 that can be sent from the controller 106 of a solid-state storage system 110 to a host system 102 to report on the spares area locations 220 still free to be assigned on the memory cards 108 of the solid-state storage system 110. In the example embodiment shown in FIG. 3, the spares count response sector 300 is a binary data sector in which ten bytes are used to report on the spares areas 210 in a solid-state storage system 110 that has eight memory cards 108. In FIG. 3, Bytes "1"-"8" 320 correspond to the eight memory cards 108 of the solid-state storage system 110 and are used to store the number of available spares locations 220 for their respective memory cards 108. The eight bits 315 of Byte "0" 310 correspond to the eight Bytes "1"-"8" 320 and are used to indicate whether or not the spares count in the corresponding byte 320 is valid. For example, in one embodiment, if a bit "0" 315 of Byte "0" 310 is set to equal "1," then the corresponding count for Card 1, as stored in Byte "1" 320, is deemed to be valid. In the embodiment depicted in FIG. 3, Byte "9" 330 stores a cumulative total of unused spares locations 220 available for the solid-state storage system 110.

Figure 4:
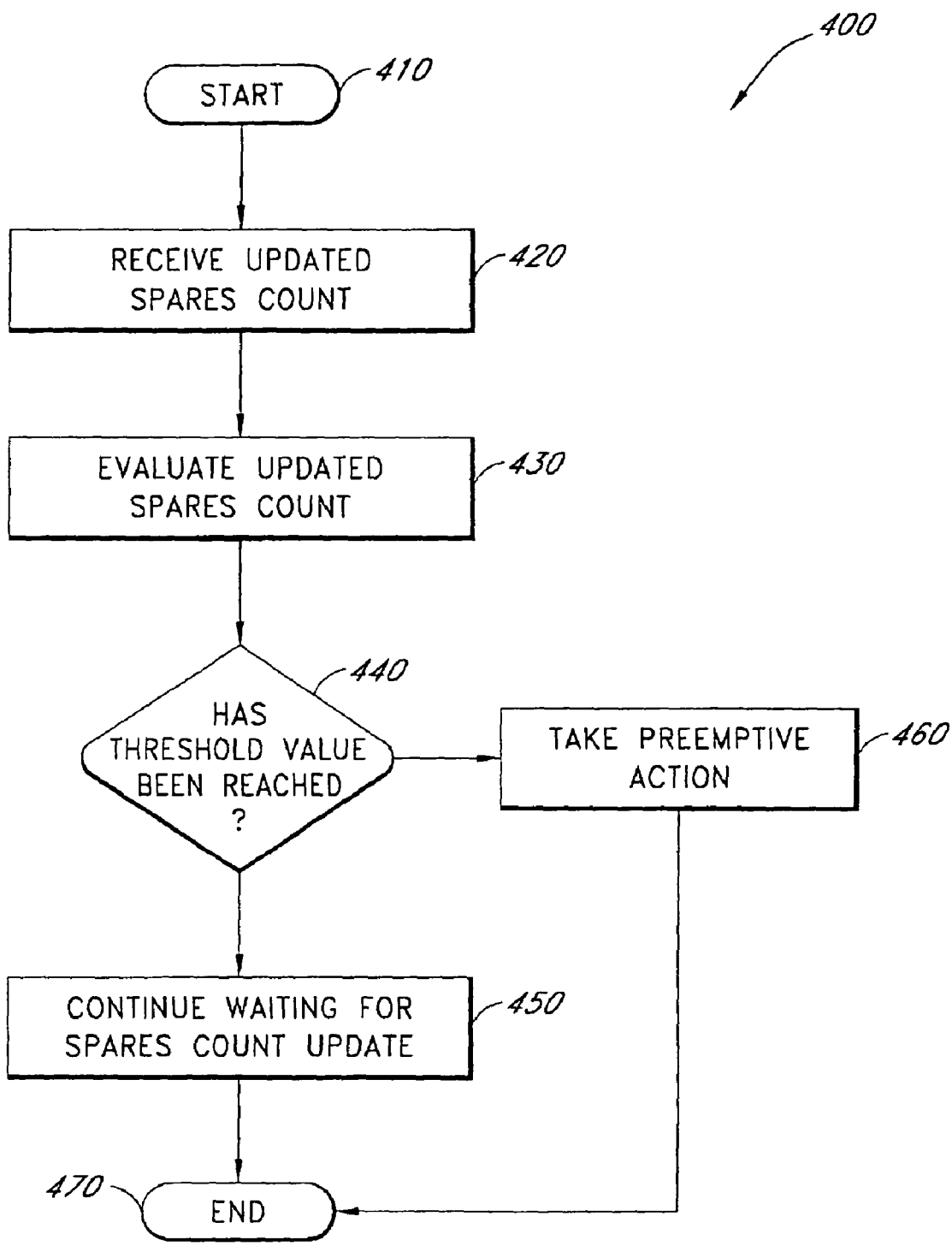
FIG. 4 illustrates a flowchart depicting one embodiment of a method for early failure detection in a computer system.

FIG. 4 presents a flowchart depicting one embodiment of a process 400 for the early detection of impending failure due to lack of spares locations 220 in a computer system 100. In FIG. 4, the process 400 is described in a generic form that may be implemented in a variety of embodiments, a sampling of which will be described below. In one embodiment, the process 400 monitors the amount of free spares locations 220 available to the system 100 and notes when the amount of available spares locations 220 reaches or drops below a threshold amount. In the event that the amount of available spares locations 220 drops below the threshold amount, the process 400 may trigger one or more of a variety of responses, some examples of which are described in greater detail below.

As described above with reference to FIGS. 1A and 1B, the computer system 100 may be configured in a wide variety of configurations depending on the functions, the storage capacities, and other requirements and parameters of the system 100. In particular, the memory capacity of the system 100 may be configured in a variety of configurations. In one embodiment, a host system 102 may be associated with a plurality of storage systems. For example, the host system 102 as depicted in FIG. 1A is associated with a plurality of solid-state storage systems 110, at least one of which comprises a plurality of memory cards 108, at least one of the memory cards 108 comprising a plurality of memory chips 222. In another embodiment, the host system 102 is directly associated with a plurality of memory cards 108. In yet another embodiment, the host system 102 is associated with a single memory card 108 that comprises eight memory chips 222. In some embodiments, a spares area 210 is set aside on each chip 222 for the relocation of data from locations in the user data area 208 that have developed defects. In some embodiments, a chip 222 that runs out of its own available spares locations 220 fails; in other embodiments, a chip 222 that runs out of spares locations 220 may use available spares locations 220 in another part of the computer system 100, and this extends its life span.

In accordance with this variety of possible configurations of the computer system 100, the process 400 described in FIG. 4 may be executed in a variety of locations in the computer system 100 and may serve to monitor all of the spares locations 220 available to the system 100, or a portion of the spares locations 220 available to the system 100, or a combination of the two. For example, in one embodiment, the process 400 is implemented within the host system 102, which receives information about the available spares locations 220 in the individual memory cards 108 of its various solid-state storage systems 110 via the system interface 104. In one embodiment, the process 400 is implemented within the host system 102 which receives information about a total aggregated amount of available spares locations 220 on each solid-state storage system 110. In one embodiment, the process 400 is implemented separately within the memory system controller 106 of each solid-state storage system 110 where the process 400 monitors the available spares locations 220 in the storage system's 110 array of one or more memory cards 108 via an interface 114 with the memory cards 108. Such an embodiment of the process 400 may communicate any necessary and related information to the host system 102 via the system interface 104. In one embodiment, the process 400 is implemented within the controller 112 of a memory card 108 to monitor the available spares locations 220 on the memory card's 108 memory chip array 120. In one embodiment, the process 400 may be implemented in an auxiliary location of the computer system 100, or in more than one of the locations described herein, or in other locations, or in a combination of these and other locations.

As shown in FIG. 4, the process 400 begins at start state 410 and continues to state 420, where an updated spares count is received. The spares count is information about the amount of spares locations 220 still available for use as alternate storage locations, and the spares count can be implemented in a number of different embodiments. For example, in one embodiment, the spares count is the number of spares locations 220 still available on a given memory chip 222. In one embodiment, the spares count is the number of spares locations 220 still available on a plurality of memory chips 222. The spares count response sector 300 illustrated in FIG. 3 is one embodiment of a structure that can be used to report on the number of spares locations 220 still available on each of an array of eight memory cards 108 as well as on the total number of spares locations 220 still available on the array of memory cards 108. In one embodiment, the spares count 220 is, conversely, the number of spares locations 220 that have been used and that are no longer available for use as alternate storage locations. In one embodiment, the spares count is a percentage value, or set of values, that indicates the percentage of remaining spares locations 220 on one or more memory chips 222. In one embodiment, the spares count may rely upon the knowledge that some types of non-volatile solid-state memory exhibit a steeply increasing defect rate near the end of their usable life-span, and the spares count may accordingly indicate a rate of defect occurrence or a measure of acceleration in a rate of defect occurrence. These and other embodiments of a spares count update are contemplated and fall within the scope of the early failure detection system.

In one embodiment, the receipt of an updated spares count may come in response to a request that is triggered by a timer set to initiate an update request after a fixed period of time has elapsed. In another embodiment, the receipt of an updated spares count may come in response to a request that is triggered by a timer set to initiate an update request after a varying period of time has elapsed. In one embodiment, the receipt of an updated spares count may come in response to a request that is triggered by a timer set to initiate an update request after a fixed or a varying period of device operation time has elapsed since a last update. In one embodiment, the receipt of an updated spares count may come in response to a request that is triggered by a counter set to send out an update request after a given number of one or more erase/write operations, or overall system operations, or other activity. In one embodiment, the receipt of an updated spares count may come in response to a request that is triggered by an increased rate of defect occurrence. In one embodiment, updated spares count information may be gathered and reported as a background activity that executes whenever a processor is free to do so.

As described above, the process 400 may be implemented in a variety of locations within a computer system 100. Similarly, the process 400 may cause the updated spares account to be received in any of these or other locations.

After receiving an updated spares count in state 420, the process 400 moves on to state 430, where the updated spares count information is evaluated to see if the amount of available spares locations has reached a threshold value that signals an impending failure of part or all of the computer system 100. With respect to state 430, a variety of embodiments exist. In one embodiment, for example, the threshold value is predetermined; in another embodiment, the threshold value is determined dynamically. In one embodiment, for example, a threshold value is determined and is applied uniformly to all similarly sized memory units. In another embodiment, a threshold value is determined individually for each memory unit based on a count of the unit's initial number of spares locations 220. The evaluation process of state 430 may take place in the host system 102, in a solid-state storage system 110, in a memory card 108, or in some other location or combination of locations. Similarly, the evaluation may be embodied in a number of different forms. A threshold value or percentage may be stored for comparison with the received spares count update. For example, a value that represents 2%, or 5%, or 20%, or some other portion of the original amount of locations set aside to be spares locations 210 may be designated as a lower acceptable bound, or threshold, on the amount of remaining spares locations before failure-preventive measures are undertaken by the system 100. Alternately, an updated spares count can be compared with an original number of available spares locations 220, which may be stored in an early detection data location 103, 107, 113 in the host system 102, in a solid-state storage system 110, in a memory card 108, or in some other location or combination of locations.

Once the updated spares count or counts have been evaluated in state 430, the process 400 moves on to state 440, where the process 400 determines if a threshold value has been reached.

If no threshold value has been reached, the process 400 moves on to state 450 where the process continues waiting for a next spares count update to be triggered. As described above with respect to state 420, many embodiments exist for triggering a spares count update request. Accordingly, in state 450, the process 400 may prepare to wait for the next trigger by resetting any necessary timers or counters or registers, by updating stored values, by making notations in a log that may be stored or viewed by system administrators, by communicating with other parts of the computer system 100, or by performing other actions. Alternately, no action may be required at this point of the process 400. Once any such preparations for continued waiting have been executed, the process 400 moves on to state 470, where the process 400 is complete and waiting for the next spares count update can commence.

Returning to state 440, if the process 400 determines that one or more threshold values have been reached, the process 400 moves on to state 460 where preemptive action can be taken to avert failure of all or part of the system 100. With respect to state 460, a variety of embodiments of preemptive actions exist. For example, in one embodiment, when the number of available spares locations 220 drops to a threshold value, the system can send an alert message to a user or to a control system to have the computer system 100, or a part of the system 100, turned off until the situation can be rectified. In one embodiment, all or part of the data stored on device in danger of impending failure can be copied to another storage device automatically, and operation of the system 100 can continue with little or no interruption. In one embodiment, back-up storage locations or devices can be activated and used to reduce the load on devices in danger of impending failure. In one embodiment, software is activated to allow for the increased sharing of spares areas 210 across chips 222 or cards 108 or other memory devices. In one embodiment, information is updated and stored. In another embodiment, information is communicated to other parts of the system 100. In one embodiment, no preemptive action is taken. These and other embodiments of a preemptive response to an evaluated impending failure are contemplated and fall within the scope of the early failure detection system.

While certain embodiments of the invention have been described, these embodiments have been presented by way of example only, and are not intended to limit the scope of the inventions. The early failure detection system may be embodied in other specific forms without departing from the essential characteristics described herein. Accordingly, the breadth and scope of the invention should be defined in accordance with the following claims and their equivalents.

What is claimed is:

1. An early failure detection method for a flash memory system that designates a quantity of storage locations as spare storage locations, the early failure detection method comprising:

tracking a total number of spare storage locations that are available on multiple memory cards, wherein the spare storage locations are assigned for use as alternate storage locations in place of defective storage locations;

calculating a percentage of initially available spare storage locations which remain available, based on the total number of spare storage locations;

determining if a threshold value has been reached based on the calculated percentage; and in the event that the threshold value has been reached, taking a preemptive action to avert impending failure of the flash memory system.

2. A method of determining the usability of a solid-state storage device, the solid-state storage device comprising a plurality of flash memory devices comprising storage locations and spare storage locations, the method comprising predicting the usability of the solid-state storage device based on a total number of unused spare storage locations in the solid-state storage device, wherein the spare storage locations are assigned for use in place of defective storage locations, and wherein the act of predicting the usability of the solid-state storage device comprises calculating a percentage of initially available spare storage locations which remain available, based on the total number of spare storage locations, and determining if a threshold value has been reached based on the calculated percentage.

3. The method of claim 2, wherein the act of predicting the usability of the solid-state storage device further comprises monitoring the frequency of the occurrence of defects in the storage locations.

4. The method of claim 2, wherein the act of predicting the usability of the solid-state storage device further comprises monitoring the rate of change in the frequency of the occurrence of defects in the storage locations.

5. A method of monitoring the life expectancy of a solid-state memory device, the method comprising:

calculating a percentage of initially available spare storage locations which remain available, based on the total number of spare storage locations available in an array of flash memory cards of the solid-state memory device, wherein the spare storage locations are assigned for use in place of defective storage locations in the solid-state storage device;

determining if a threshold value has been reached based on the calculated percentage; and performing an action when the threshold value has been reached, so as to avoid the consequences of the failure of the flash memory cards.

6. The method of claim 5, wherein the threshold value is maintained by a controller in the solid-state memory device.

7. The method of claim 5, wherein the threshold value is based on the number of spare storage locations typically available within other solid-state memory devices similar to the solid-state memory device.

8. A flash memory device comprising:

a plurality of flash storage devices each comprising:
  a plurality of storage locations; and
  a plurality of spare storage locations assigned for use in place of defective storage locations; and processor circuitry configured to calculate a percentage of initially available spare storage locations which remain available based on the total number of spare storage locations available in the flash memory device, determine if a threshold value has been reached based on the calculated percentage, and perform an action when the threshold value has been reached.

9. The flash memory device of claim 8, wherein at least one flash storage device of the plurality of flash storage devices in the flash memory device is a flash memory card.

10. The flash memory device of claim 8, wherein at least one flash storage device of the plurality of flash storage devices in the flash memory device is a flash memory chip.

11. The flash memory device of claim 8, wherein the flash plurality of flash storage devices is an array of flash memory cards.

12. The flash memory device of claim 8, wherein storage locations can be dynamically allocated as spare storage locations.

13. The flash memory device of claim 8, wherein the action performed by the processor circuitry allows for the use of other unused spare storage locations accessible by the flash memory device to serve as supplemental spare storage locations.

14. The flash memory device of claim 8, wherein the processor circuitry is further configured to evaluate the number of available spare storage locations by referring to a counter that is based on the number of times new spare storage locations are used.

15. The flash memory device of claim 8, wherein the processor circuitry is further configured to evaluate the number of available spare storage locations by evaluating available spare storage locations at predetermined time intervals.

16. The flash memory device of claim 8, wherein the processor circuitry is further configured to evaluate the number of available spare storage locations upon request by a host system.

17. A system for determining the usability of a solid-state storage device, the system comprising:

means for monitoring the number of available spare storage locations in multiple memory cards of the solid-state storage device, wherein the spare storage locations are assigned for use in place of defective storage locations;

means for calculating a percentage of initially available spare storage locations which remain available, based on the total number of spare storage locations available in the multiple memory cards;

means for determining if a threshold value has been reached based on the calculated percentage; and means for performing an action when the threshold value has been reached, so as to avert the consequences of the potential failure of the solid-state storage device.

* * * * *